(12) United States Patent
Inoue et al.

(10) Patent No.: US 8,785,041 B2
(45) Date of Patent: Jul. 22, 2014

(54) ELECTRODE AND PRODUCTION METHOD THEREOF

(75) Inventors: Shiho Inoue, Yokohama (JP); Hideaki Horie, Yokosuka (JP); Kenji Hosaka, Yokosuka (JP); Osamu Shimamura, Yokohama (JP); Shigeo Ibuka, Ebina (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 576 days.

(21) Appl. No.: 13/126,106

(22) PCT Filed: Dec. 11, 2009

(86) PCT No.: PCT/IB2009/007777
§ 371 (c)(1),
(2), (4) Date: Apr. 26, 2011

(87) PCT Pub. No.: WO2010/070424
PCT Pub. Date: Jun. 24, 2010

(65) Prior Publication Data
US 2011/0206974 A1    Aug. 25, 2011

(30) Foreign Application Priority Data
Dec. 19, 2008   (JP) .................................. 2008-324131

(51) Int. Cl.
*H01M 4/66* (2006.01)
*H01M 4/62* (2006.01)
*H01M 4/04* (2006.01)
*H01M 10/0585* (2010.01)
*H01M 10/04* (2006.01)
*H01M 10/0525* (2010.01)

(52) U.S. Cl.
CPC .............. *H01M 4/043* (2013.01); *H01M 4/668* (2013.01); *H01M 4/623* (2013.01); *H01M 4/622* (2013.01); *H01M 10/0525* (2013.01); *H01M 4/621* (2013.01); *H01M 4/667* (2013.01); *H01M 4/0433* (2013.01); *H01M 10/0585* (2013.01); *Y02E 60/12* (2013.01); *H01M 10/0418* (2013.01)
USPC ........... 429/210; 429/209; 429/232; 429/233; 29/623.1; 29/623.4

(58) Field of Classification Search
USPC ............ 427/115; 429/623.1–623.5, 209, 210, 429/232, 233; 29/623.1–623.5
See application file for complete search history.

(56) References Cited

U.S. PATENT DOCUMENTS 5,547,782 A     8/1996   Dasgupta et al.
5,720,780 A *   2/1998   Liu et al. ...................... 29/623.1
(Continued)

FOREIGN PATENT DOCUMENTS

EP          2058883 A1      5/2009
JP          61-284057       12/1986
(Continued)

OTHER PUBLICATIONS

Atofina. Kynar and Kynar Flex PVDF Material Data, 2001.*
(Continued)

*Primary Examiner* — Carlos Barcena
(74) *Attorney, Agent, or Firm* — Young Basile

(57) ABSTRACT

An electrode includes a collector formed with a conductive resin layer and an active material layer formed on the conductive resin layer. The active material layer comprises an active material and a binder polymer, and the conductive resin layer is bonded by thermal fusion bonding to the active material layer.

6 Claims, 10 Drawing Sheets

(56) References Cited

U.S. PATENT DOCUMENTS

| | | | |
|---|---|---|---|
| 5,840,087 A * | 11/1998 | Gozdz et al. | 29/623.3 |
| 6,497,979 B1 * | 12/2002 | Iijima et al. | 429/223 |
| 6,558,846 B1 * | 5/2003 | Tsushima et al. | 429/231.8 |
| 2002/0110728 A1 * | 8/2002 | Gozdz et al. | 429/62 |
| 2003/0072999 A1 * | 4/2003 | Birke et al. | 429/217 |
| 2003/0129489 A1 | 7/2003 | Kamisuki et al. | |
| 2004/0234831 A1 | 11/2004 | Kobayashi et al. | |
| 2007/0195125 A1 | 8/2007 | Saito et al. | |
| 2007/0269714 A1 | 11/2007 | Watanabe et al. | |
| 2008/0124623 A1 | 5/2008 | Hisamitsu et al. | |
| 2008/0131759 A1 | 6/2008 | Hosaka et al. | |
| 2008/0131775 A1 | 6/2008 | Takayama et al. | |
| 2008/0138706 A1 | 6/2008 | Takayama et al. | |
| 2008/0220330 A1 | 9/2008 | Hosaka et al. | |
| 2008/0292952 A1 | 11/2008 | Yanagihara et al. | |
| 2008/0292953 A1 | 11/2008 | Hosaka et al. | |
| 2009/0047575 A1 | 2/2009 | Abe et al. | |
| 2009/0117456 A1 | 5/2009 | Hosaka et al. | |
| 2009/0253038 A1 | 10/2009 | Segawa et al. | |
| 2011/0014521 A1 | 1/2011 | Matsuyama et al. | |
| 2011/0039146 A1 | 2/2011 | Sato et al. | |

FOREIGN PATENT DOCUMENTS

| | | |
|---|---|---|
| JP | 62-243248 | 10/1987 |
| JP | 09-213338 | 8/1997 |
| JP | 11-021454 | 1/1999 |
| JP | 11-312516 A | 11/1999 |
| JP | 2004-273304 | 9/2004 |
| JP | 2006-190649 | 7/2006 |
| JP | 2007-213930 | 8/2007 |
| JP | 2007-329004 | 12/2007 |
| RU | 2295176 C2 | 3/2007 |
| RU | 2313855 C2 | 12/2007 |

OTHER PUBLICATIONS

DOW Product Safety Assessment ADCOTE™ 50 Series Ethylene Acrylic Acid (EAA) Heat-Seal Coatings, Sep. 25, 2013.*
Chemical Book, Polyacrylic acid Product Description, 2007.*
European Office Action dated Mar. 5, 2014 from the corresponding EP Application No. 09883005.3.
Gary W. Ver Strate and David J. Lohse, Ethylene-propylene-diene monomer elastomers, Polymer Data Handbook, Jan. 1, 1999, 103-109, 600-606, 949-955, Oxford University Press, New York, NY.

* cited by examiner

ELECTRODE AND PRODUCTION METHOD THEREOF

CROSS-REFERENCE TO RELATED APPLICATIONS

This application claims priority from Japanese Patent Application Serial No. 2008-324131, filed Dec. 19, 2008, which is incorporated herein in its entirety by reference.

TECHNICAL FIELD

The present invention relates to an electrode and a production method thereof.

BACKGROUND

In recent years, the reduction of carbon dioxide emissions has been sincerely desired for the purpose of environmental protection. The automotive industry has a growing expectation on the introduction of electric vehicles (EV) and hybrid electric vehicles (HEV) for the reduction of carbon oxide emissions and has increasingly developed motor-drive secondary batteries, which become key to the practical application of these electric vehicles. Among the secondary batteries, attention is being given to lithium-ion secondary batteries of high energy density and high output density.

In the lithium-ion secondary battery, an electrode is generally formed by applying a positive electrode active material or negative electrode active material to a collector with the use of a binder material.

Conventionally, the collector of the lithium-ion secondary battery is a metal foil. As a substitute for the metal foil collector, a conductive resin-containing collector has recently been put into use. (See e.g. Japanese Laid-Open Patent Publication No. 61-285664.) The resin-containing conductive collector is lighter in weight than the metal foil collector and is thus expected to improve battery power output.

BRIEF SUMMARY

However, the electrode with the conventional resin-containing conductive collector has the problem of high contact resistance between the resin-containing conductive collector and the active material layer. Further, the lithium-ion secondary battery has the problem of separation of the positive or negative electrode active material layer from the resin-containing conductive collector under the application of stress as the positive or negative electrode active material layer expands and contracts due to absorption and release of lithium ions into the active material layer during charge/discharge cycles.

As a result of extensive research, it has been found that the above problems can be solved by an electrode in which a conductive collector has a resin layer bonded by thermal fusion bonding to an active material layer.

In embodiments of the present invention, the electrode is formed by thermal fusion bonding of the resin layer of the collector with the active material layer. This makes it possible to improve adhesion between the collector and the active material layer, prevent separation of the active material layer from the collector and reduce contact resistance between the collector and the active material layer

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Figure 1:
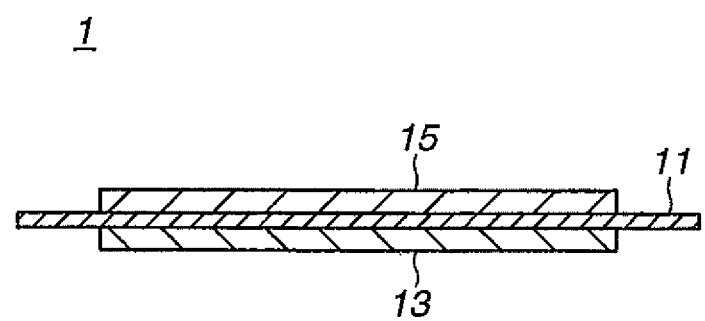
FIG. 1 is a schematic cross-section of a bipolar electrode according to one embodiment of the invention.

The present invention will be described below in detail with reference to the drawings. In the drawings, the dimensions of the respective parts and portions may be exaggerated for purposes of illustration in the drawings and may be different from the actual dimensions.

FIG. 1 is a schematic view showing bipolar electrode 1 for a bipolar lithium-ion secondary battery according to one embodiment (referred to as a first embodiment) of the invention. Bipolar electrode 1 has collector 11, positive electrode layer (positive electrode active material layer) 13 formed on one side of collector 11 and negative electrode layer (negative electrode active material layer) 15 formed on the other side of collector 11. Collector 11 is bonded by thermal fusion bonding to positive electrode active material layer 13 and to negative electrode active material layer 15. In the first embodiment, collector 11 consists of a conductive resin layer or layers.

The thermal fusion bonding of the collector 11 to the active material layers 13, 15 allows a reduction in the resistance between the collector 11 and the active material layers 13, 15 and an improvement in the separation resistance between the collector 11 and the active material layers 13, 15.

Herein, the thermal fusion bonding refers to a state in which a polymer material is softened and adhered to a substrate material by heating the polymer material for several seconds to several hours at a temperature higher than a softening point of the polymer material.

In the case of an ordinary battery other than a bipolar battery, a collector has the function of collecting an electric charge from a negative electrode and supplying the electric charge into a tab or transmitting an electric charge supplied from a tab to a positive electrode. It is thus required that the collector of the ordinary battery shows a low electrical resistance in a horizontal (planar) charge-transfer direction. In order to decrease the horizontal electrical resistance of the collector, a metal foil of certain thickness is used as the collector of the ordinary battery. In the case of a bipolar battery, by contrast, a collector directly supplies an electric charge from its negative electrode side to its positive electrode side. The electric charge flows in a lamination direction of the structural components of the bipolar battery and do not need to flow in a horizontal direction of the bipolar battery. The collector of the bipolar battery is not necessarily made of metal foil as it is not necessary to decrease the horizontal electrical resistance of the collector. Further, the application of a conductive collector containing a resin layer(s), preferably a collector consisting of a conductive resin layer(s), to the bipolar battery electrode enables a reduction in electrode weight. The weight reduction of the electrode advantageously leads to high battery output density.

For these reasons, the electrode 1 of the prevent invention is suitable for use in the bipolar battery and is thus preferably of the bipolar type as in the first embodiment of FIG. 1. When the electrode 1 of the present invention is of the bipolar type as in the first embodiment, the collector preferably but not necessarily has a volume resistivity of $10^2$ to $10^{-5}$ Ω·cm. The collector with such a volume resistivity is particularly suitable for use in the bipolar battery.

The structural components of the electrode 1 will be explained in more detail below.

The collector 11 has at least one conductive resin layer. For thermal fusion bonding of the collector 11 to the active material layers 13, 15, at least one outermost layer of the collector 11 adjacent and adjoined to the active material layer 13 or 15 is formed as the resin layer. Specific examples of the collector 11 are those formed from one or more resin layers or formed from a laminate of resin and metal foil layers. In terms of weight reduction, the collector is preferably formed from one or more resin layers (i.e., a single resin layer or two or more resin layers).

The resin layer contains a polymer material as an essential component. In order for the resin layer to exhibit electrical conductivity, there are two possible forms: (1) the form in which the polymer material is a conductive polymer; and (2) the form in which the resin layer contains a conductive filler.

The conductive polymer is selected from those having electrical conductivity but not allowing conduction of ions as a charge-transfer medium. Conjugated polyene can be used as the conductive polymer, which is assumed to show electrical conductivity by energy band formation and is currently proceeding toward practical use in electrolytic capacitors, etc. Preferred examples of the conjugated polyene are polyaniline, polypyrrole, polythiophene, polyacetylene, polyparaphenylene, polyphenylenevinylene, polyacrylonitrile, polyoxadiazole and any mixture thereof. Particularly preferred are polyaniline, polypyrrole, polythiophene and polyacetylene in terms of electrical conductivity and stable use in the battery.

The conductive filler is selected from those having electrical conductivity, but not allowing conduction of ions as a charge-transfer medium, and having the ability to withstand positive and negative electrode potentials to be applied. Examples of the conductive filler are aluminum particles, SUS particles, carbon particles such as graphite and carbon black, silver particles, gold particles, copper particles, titanium particles and any conductive alloy particles thereof. The conductive filler is not limited to the above. The conductive filler may be of one kind or of two or more kinds. Any other commercially practical conductive fillers such as so-called conductive resin fillers like carbon nanotubes can also suitably be used.

The distribution of the conductive filler in the resin layer is not necessarily uniform and can be changed depending on the position within the resin layer. It is conceivable to use two or more kinds of conductive filler materials in combination in such a manner that the conductive filler materials have different distributions. For example, the conductive filler of the positive electrode side may be different in kind from that of the negative electrode side. The conductive filler of the positive electrode side is preferably selected from aluminum particles, SUS particles, gold particles and carbon particles, more preferably carbon particles, in terms of electrical conductivity. The conductive filler of the negative electrode side is preferably selected from silver particles, gold particles, copper particles, titanium particles, SUS particles and carbon particles, more preferably carbon particles, in terms of electrical conductivity. The carbon particles such as carbon black and graphite have a large potential window so as to be stable to a wide range of positive and negative electrode potentials and show high electrical conductivity. The carbon particles also save weight to minimize increase in weight. Further, the carbon particles are often contained as a conductive aid in the electrode layer. The contact resistance between the collector and the electrode layer can be reduced by using the same carbon material as the conductive filler and as the conductive aid of the electrode layer. In the case of using the carbon particles as the conductive filler, the carbon particles may be subjected to hydrophobic treatment so as to decrease the compatibility of an electrolyte material to the collector and thereby make it unlikely that the electrolyte material will penetrate into pores of the collector.

The average particle size of the conductive filler is not particularly restricted but is generally in the range of 10 nm to 100 μm. In the present specification, the term "particle size" refers to a maximum distance L between any two points on the contour of a particle. The term "average particle size" refers to an average of the particle sizes of particles observed. A procedure of the calculation method of the average particle size is the following. At first a random part of target materials is observed by observation means such as scanning electron microscope (SEM) or transmission electron microscope (TEM). And then a particle diameter of a particle existing in the random observed field of vision is measured. Next, the field of vision is changed, and the particle diameter of particles in another field of vision is measured by the same method. While changing a field of vision, the same observation is repeated several times or dozens of times. The average particle size is the average of the particle diameters measured in each field of vision.

When the conductive filler is contained in the resin layer, the polymer material of the resin layer preferably includes a nonconductive polymer that performs the function of binding the conductive filler. The use of such a nonconductive polymer in the resin layer enhances binding of the conductive filler for battery reliability improvement. The nonconductive polymer is selected from those having the ability to withstand positive and negative electrode potentials to be applied. Preferably, the nonconductive polymer is a thermoplastic polymer for thermal fusion bonding of the collector 11 to the active material layers 13, 15.

Examples of the nonconductive polymer are: polyolefins such as polyethylene (PE) and polypropylene (PP); polyesters such as polyethylene terephthalate (PET) and polyethernitrile (PEN); polyimide (PI); polyamide (PA); polyvinylidene fluoride (PVdF); polytetrafluoroethylene (PTFE); styrene-butadiene rubber (SBR); polyacrylonitrile (PAN); polymethylacrylate (PMA); polymethylmethacrylate (PMMA) and polyvinyl chloride (PVC). The above polymer compounds can be used alone or in combination of two or more thereof. Among these, polyolefins, polyesters, polyimide, polyamide and polyvinylidene fluoride are preferred. These polymer compounds are readily fused by heat and thus easily bonded by fusion bonding to the active material layer. Further, these polymer compounds have a large potential window so as to be stable to positive and negative potentials and save weight for high battery output density.

The conductive polymer preferably has a softening point of 50 to 400° C., more preferably 100 to 200° C. The nonconductive polymer preferably has a softening point of 50 to 400° C. When the active material layer contains a thermoplastic binder polymer, the polymer material preferably has a softening point of 100 to 200° C. By controlling the softening point of the polymers to within such ranges, it is possible to enhance thermal fusion bonding and obtain an improvement in productivity. In the present specification, the softening point is measured by Vicat softening point test according to JIS K 7206 (1999). In the case of the polymer material being a mixture of two or more polymers, the softening point of the polymer mixture is measured and employed as the overall softening point. The same applies to the softening point of the binder polymer described hereinafter.

The content ratio of the polymer material and the conductive filler is not particularly restricted. The content of the conductive filler is preferably in the range of 2 to 90 mass %, more preferably 10 to 50 mass %, based on the total mass of the polymer material and the conductive filler. By adding a sufficient amount of conductive filler, it is possible to impart adequate electrical conductivity to the collector.

The polymer material of the resin layer can be selected as appropriate depending on the binder polymer of the active material layer. It is preferable that the polymer material of the resin layer has a softening point lower than a melting point of the binder polymer of the active material layer, or that the binder polymer of the active material layer is a thermosetting binder polymer. If the electrode binder polymer melts, there arises a possibility that the electrode resistance increases to cause performance deterioration of a battery due to a reduction in contact of the electrode active material or conductive aid. It is thus desirable to set the thermal fusion bonding temperature as appropriate by selecting the polymer material of the resin layer and the binder polymer of the active material layer in such a manner that the softening point of the polymer material of the resin layer is lower than the melting point of the binder polymer of the active material layer or by selecting the thermosetting binder polymer for the active material layer. This material selection and thermal fusion bonding temperature setting allows the polymer material of the resin layer to fuse, but does not allow the binder polymer of the active material layer to melt, during the process of thermal fusion bonding of the collector 11 to the active material layers 13, 15, so as to prevent an increase in particle-to-particle resistance in the electrode layer and to secure proper thermal fusion bonding of the collector 11 and the electrode layer (active material layers 13, 15). It is thus possible to obtain a reduction in contact resistance between the conductive resin layer and the electrode layer for improvement in battery output performance. The suitable range of the thermal fusion bonding temperature will be explained later. The softening point of the polymer material of the resin layer is preferably 10 to 100° C. lower, more preferably 10 to 55° C. lower, than the melting point of the binder polymer although it varies depending on the material.

When two active material layers 13, 15 are formed on the opposite sides of the collector 11, the binder polymers of these active material layers 13, 15 may be different in kind from each other. In this case, it is preferable to select the polymer material of the resin layer of the collector 11 in such a manner that the softening point of the polymer material of the resin layer is lower than the lower one of the melting points of the binder polymers of the active material layers 13, 15. When the collector 11 has a plurality of resin layers, it is preferable that the melting point of the binder polymer of the active material layers 13, 15 is higher than the softening point of the polymer material of the outermost layer of the collector 11 adjoining to the active material layers 13, 15. It is further preferable that, when the collector 11 has a laminated structure of two or more resin layers in which two outermost layers contain polymer materials of different softening points and lies between two active material layers 13, 15, the melting points of the binder polymers are higher than the higher one of the softening points of the polymer materials of the outermost layers of the collector 11.

The collector 11 may contain any additive or additives to the polymer material and the conductive filler.

Although the thickness of the collector 11 is not particularly restricted, it is desirable to minimize the thickness of the collector 11 for high battery output density. In the bipolar battery, the collector 11 between the positive and negative electrodes (positive active material layer 13 and negative active material layer 15) can be made high in electrical resistance and thus made small in thickness. In particular, the thickness of the collector 11 is preferably 500 µm or smaller, more preferably 0.1 to 80 µm.

As explained above, the collector 11 can be formed of a single resin layer or formed of a laminated material of two or more resin layers. It is desirable that the collector 11 comprise a single resin layer in terms of productivity and cost efficiency. On the other hand, it is also desirable that the collector 11 comprise a laminated material of three or more resin layer. For example, when the collector 11 comprises a three-layer laminated material for use in the bipolar electrode, the laminated material includes two outermost layers adjoining to the active material layers 13, 15 and one inner layer interposed between these two outer most layers. The presence of such an inner layer in the collector 11 leads to an improvement in peel strength between the collector 11 and the active material layers 13, 15. The reason for the peel strength improvement is assumed to be that the inner layer exerts a buffering effect to increase adhesion of the outermost resin layer and the active material layers 13, 15. Hereinafter, in the case of the laminated material of three or more layers, two of the three or more layers located outermost of the laminated material are referred to as "outermost layers"; and any of the layers interposed between the outermost layers are referred to as "inner layer(s)". In terms of overall collector thickness, the number of the resin layers of the laminated material of the collector 11 is preferably ten or less. Further, the thickness of each of the resin layers of the collector 11 is preferably 0.1 to 500 µm, more preferably 0.1 to 80 µm.

When the collector 11 has three or more resin layers, it is preferable that the softening point of the polymer material of the outermost resin layers adjacent and adjoining to the active material layers 13, 15 is lower than the softening point of the polymer material of the inner layer interposed between the outermost layers. If the polymer material of the inner layer fuses ahead of the polymer material of the outermost layers adjacent and adjoining to the active material layers 13, 15 in the process of thermal fusion bonding, there arises a possibility that the buffering effect of the inner layer becomes reduced and can fail in improving the peel strength of the collector 11 and the active material layers 13, 15. It is thus desirable to set the thermal fusion bonding temperature by selecting the polymer materials in such a manner that the softening point of the polymer material of the inner layer is higher than the softening point of the polymer material of the outermost layer. This material selection and thermal fusion bonding temperature setting allows the inner layer to exert its buffering effect properly and thereby improves the peel strength of the collector 11 and the active material layers 13, 15. The suitable range of the thermal fusion bonding temperature will be explained later. When two or more inner layers are present, it is preferable to select the polymer materials in such a manner that the softening point of the outermost layers adjacent and adjoining to the active material layers 13, 15 is lower than the lowest one of the softening points of the polymer materials of the inner layers.

When the collector 11 has two outermost layers adjacent and adjoining to the active material layers 13, 15 as in the bipolar electrode, it is preferable to select the polymer materials in such a manner that the softening point of the polymer material of the inner layer is higher than the higher one of the softening points of the polymer materials of the two outermost layers.

The resistance of the collector 11 is not also particularly restricted. It is preferable to select the material or materials of the collector 11 in such a manner that the resistance of the collector 11 is lower than or equal to one-hundredth of the total battery resistance, more preferably lower than or equal to one-thousandth of the total battery resistance.

The active material layers 13, 15 contain an active material and optionally an additive or additives.

More specifically, the positive electrode active material layer 13 contains a positive electrode active material. Examples of the positive electrode active material are lithium-transition metal composite oxides such as $LiMn_2O_4$, $LiCoO_2$, $LiNiO_2$, $Li(Ni-Co-Mn)O_2$ and those in which another element substitutes for part of the transmission metal. Two or more kinds of positive electrode active materials may be used in combination. In terms of capacity and output characteristics, the lithium-transition metal composite oxides are preferred as the positive electrode active material. It is needless to say that any other positive electrode active materials can suitably be used.

The negative electrode active material layer 15 contains a negative electrode active material. Examples of the negative electrode active material are carbon materials such graphite, soft carbon and hard carbon, lithium-transition metal composite oxide such as $Li_4Ti_5O_{12}$, metal materials and lithium alloy negative electrode materials. Two or more kinds of negative electrode active materials may be used in combination. In terms of capacity and output characteristics, the carbon materials and the lithium-transition metal composite oxides are preferred as the negative electrode active material. It is needless to say that any other negative electrode active materials can suitably be used.

The average particle size of the active material in the active material layers 13, 15 is not particularly restricted and is preferably in the range of 1 to 20 μm in terms of high output performance.

The active material layers 13, 15 also contain the binder polymer as mentioned above.

There is no particular restriction on the binder polymer contained in the active material layers 13, 15. Preferred examples of the binder polymer contained in the active material layers 13, 15 are: polypropylene; polyesters such as polyethylene terephthalate (PET) and polyethernitrile (PEN); polyimide; polyamide; polyvinylidene fluoride (PVdF); epoxy resin; and synthetic rubber. These binder polymer compounds have a large potential window so as to be stable to a wide range of positive and negative electrode potentials and show high heat resistance for suitable use in the active material layers 13, 15. The polymer compounds can be used alone or in combination of two or more thereof. Among the examples, PVdF and epoxy resin are more preferred in terms of thermal fusion bonding temperature and electrode binding property. When the binder polymer is a thermoplastic polymer, the softening point of the binder polymer is preferably 10 to 1000° C., more preferably 50 to 500° C. Further, the melting point of the binder polymer is preferably 15 to 1050° C., more preferably 55 to 510° C. By using temperature range control, it is possible to enhance ease of thermal fusion bonding and obtain an improvement in productivity. It is also preferable that the binder polymer is a thermosetting polymer for ease of thermal fusion bonding. Preferred examples of the thermosetting binder polymer are thermosetting polyimide, thermosetting polyamide, epoxy resin and synthetic rubber. Among these, thermosetting polyimide and epoxy resin are particularly preferred.

The content of the polymeric binder material in the active material layers 13, 15 is not particularly restricted as long as it is enough to bind the active material. Preferably, the content of the binder polymer is 0.1 to 99 mass %, more preferably 1 to 50 mass %, based on the total mass of the active material layer 13, 15.

The other additives of the active material layer include a conductive aid, an electrolytic salt (lithium salt) and an ion-conductive polymer.

The conductive aid refers to an additive for improvement in conductivity of the positive or negative electrode active material layer 13, 15. Examples of the conductive aid are carbon materials such as carbon black e.g. acetylene black, graphite and vapor grown carbon fiber. The addition of the conductive aid to the active material layers 13, 15 enables effective formation of an electronic network within the active material layers 13, and contributes to an improvement in battery output performance.

Examples of the electrolytic salt (lithium salt) are $Li(C_2F_5SO_2)_2$, $LiPF_6$, $LiBF_4$, $LiClO_4$, $LiAsF_6$ and $LiCF_3SO_3$.

Examples of the ion-conductive polymer are polyethylene oxide (PEO) polymers and polypropylene oxide (PPO) polymers.

The content ratio of the components of the active material layers 13, 15 is not particularly restricted and can be adjusted as appropriate in the light of any knowledge about nonaqueous solvent secondary batteries. The thickness of the active material layers 13, 15 is not also particularly restricted and can be adjusted in the light of knowledge about batteries. For example, the thickness of each of the active material layer s 13, 15 ranges from about 2 to 100 μm.

The electrode 1 of the present invention is not limited to the bipolar electrode as in the first embodiment of FIG. 1 and can alternatively be configured as a positive electrode in which positive electrode active material layers 13 are formed on the opposite sides of the collector or a negative electrode in which negative electrode active material layers 15 are formed on the opposite sides of the collector. It is however noted that, when the electrode is configured as the bipolar electrode, the effects of the present invention are more pronounced as mentioned above.

A preferable electrode production method (referred to as a second embodiment) includes a first step for providing a collector 11 with the conductive resin layer and forming the active material layers 13, 15 containing the active material and binder polymer on the resin layer and a second step for bonding the resin layer to the active material layers 13, 15 by thermal fusion bonding.

As explained above, the collector 11 with the conductive resin layer has an advantage in weight reduction but can lead to difficulties in the production of the electrode 1. For example, there is a case where, at the time of coating an electrode slurry onto the resin layer, crawling of the coating material occurs due to low compatibility of the electrode coating solvent to the resin layer. There is also a case where the collector 11 cannot be subjected to strong press as the polymer material is contained in the collector 11. However, the thermal fusion bonding of the collector 11 and the active material layers 13, 15 allows easy production of the electrode 1 with improved peel strength between the collector 11 and the active material layers 13, 15.

Each of the production steps will be explained below, starting with the first step.

The polymer-containing resin layer of the collector 11 can preferably be formed by spraying or coating. More specifically, the resin layer can be formed by preparing a slurry containing the polymer material and applying and curing the slurry. As the polymer material for preparation of the slurry has been exemplified above, further explanation of the polymer material will be omitted. The conductive filler may additionally be contained in the slurry. Further explanations of the conductive filler will also be omitted as the conductive filler has been exemplified above. Alternatively, the resin layer can be formed by the following procedure: a pellet is prepared by melting/kneading the polymer material and, in some cases, the conductive filler and optionally any suitable solvent, followed by extruding the prepared pellet into a sheet or film.

When the collector 11 has a plurality of resin layers, there is no particular limitation on the process of laminating the polymer-containing resin layers. The resin layers can be laminated by any known process such as dry laminate process, extrusion laminate process, hot-melt laminate process, wet laminate process or thermal laminate process.

One preferable example of the first step includes preparing the slurry with the addition of the active material and the binder polymer to the solvent, and then applying the electrode slurry to a transfer substrate. The material of the transfer substrate is not particularly limited. It is however desirable that the transfer substrate is easy to separate from the electrode layer (positive and negative electrode active material layers 13, 15) and has sufficient peel strength to resist separation even when subjected to press working. Specific examples of the transfer substrate are metal foil materials such as aluminum foil, copper foil, SUS foil and titanium foil. It is preferable to, after forming the active material layers 13, 15 with the application of the electrode slurry to the transfer substrate, laminate the collector 11 on the active material layers 13, 15, and then subject the resulting laminate (also referred to as "electrode-transfer substrate laminate") to the subsequent second step. Crawling of the electrode slurry is likely to occur when the electrode slurry is directly applied to the collector 11. However, the formation of the active material layers 13, 15 on the collector 11 by such a transfer technique makes it unlikely that crawling of the electrode slurry will occur and thereby makes it possible to improve the adhesion between the active material layers 13, 15 and the collector 11. It is further preferable to, after applying the electrode slurry to the transfer substrate, subject the laminate to pressing as appropriate.

Another preferable example of the first step includes preparing a high-viscosity electrode slurry (as an active material layer precursor), and then applying the electrode slurry to the resin layer. The formation of the active material layers 13, 15 by the direct application of the electrode slurry to the collector 11 eliminates the process of applying the electrode material to the transfer substrate as in the above transfer technique and thereby makes it possible to simplify the electrode production method. When the electrode slurry is low in viscosity, there is a possibility that crawling of the electrode slurry occurs during the application of the slurry to the collector 11. It is thus preferable that the slurry has a high viscosity so as to be put on the resin layer without crawling. The viscosity of the slurry is preferably in the range of 100 to 100,000 cps at 30 to 40° C.

There is no particular limitation on the process of applying the electrode slurry to the transfer substrate/collector 11. The electrode slurry can be applied by any common process such as self-running coater process, doctor blade process or spray process.

The electrode slurry is prepared by mixing the active material, conductive aid and binder polymer, optionally together with other components (e.g. ion-conductive polymer, support salt (lithium salt), polymerization initiator, dispersant, etc.) as needed, into a solvent. As the components of the slurry have been exemplified above, further detailed explanations of the slurry components will be omitted.

The solvent of the slurry is not particularly limited and can be selected as appropriate in the light of knowledge about electrode production. Examples of the solvent are N-methyl-2-pyrrolidone (NMP), N,N-dimethylformamide, dimethylacetamide and methylformamide. In the case of using polyvinylidene fluoride (PVdF) as the binder polymer, it is suitable to use NMP as the solvent. The viscosity of the slurry can be selected by increasing or decreasing the amount of the solvent used.

The content ratio of the slurry components is not particularly limited.

The second step is to bond the resin layer to the active material layers 13, by thermal fusion bonding. The thermal fusion bonding of the resin layer and the active material layers 13, 15 is performed by applying heat to the electrode-transfer substrate laminate or to the electrode material (in which the electrode slurry is applied to the collector 11). The thermal fusion bonding may be done under pressurized conditions.

The thermal fusion bonding temperature can be set as appropriate depending on the softening point of the polymer material of the resin layer and the melting point of the binder polymer of the active material layer as explained above.

When the binder polymer is a thermoplastic polymer, it is preferable to set the thermal fusion bonding temperature so as to satisfy the following condition: $(Tb-10)<T<Ta$ where $T$ (° C.) is the thermal fusion bonding temperature; $Tb$ (° C.) is the softening point of the polymer material of the resin layer; and $Ta$ (° C.) is the melting point of the binder polymer. It is more preferable that the thermal fusion bonding temperature $T$ is higher than or equal to $Tb$ (° C.). It is also more preferable that the thermal fusion bonding temperature $T$ is lower than the softening point of the binder polymer. In practice, the temperature at which the thermal fusion bonding starts occurring upon softening of the polymer material varies depending on the kind of the polymer material. The thermal fusion bonding may start occurring at the softening point or may start occurring at a temperature several degrees lower than the softening point. The thermal fusion bonding temperature is thus preferably set higher than a temperature at which the polymer material starts softening and becomes capable of thermal fusion bonding.

When the binder polymer is a thermosetting polymer, it is preferable to set the thermal fusion bonding temperature so as to satisfy the following condition: $(Tb'-10)<T'$ where $T'$ (° C.) is the thermal fusion bonding temperature; and $Tb'$ (° C.) is the softening point of the polymer material of the resin layer. It is more preferable that the thermal fusion bonding temperature $T'$ is higher than or equal to $Tb'$ (° C.). The temperature at which the thermal fusion bonding starts occurring upon softening of the polymer material varies depending on the kind of the polymer material. The thermal fusion bonding may start occurring at the softening point or may start occurring at a temperature several degrees lower than the softening point. The thermal fusion bonding temperature is thus preferably set higher than a temperature at which the polymer material starts softening and becomes capable of thermal fusion bonding.

The reason for the above suitable thermal fusion bonding temperature setting is as follows. If the electrode binder polymer melts, there arises a possibility that the electrode resistance increases to cause performance deterioration of a battery due to a reduction in contact of the electrode active material or conductive aid. It is thus desirable to set the thermal fusion bonding temperature as appropriate by selecting the thermosetting polymer as the polymer material of the resin layer or the binder polymer of the positive or negative electrode active material layer 13, 15 in such a manner that the softening point of the polymer material of the resin layer is lower than the melting point of the binder polymer of the active material layers 13, 15. In addition to this, it is desirable to satisfy the following conditions: (1) to set the thermal fusion bonding temperature to a temperature at which the binder polymer of the active material layers 13, 15 does not melt; and (2) to set the thermal fusion bonding temperature to a temperature at which the polymer material of the resin layer undergoes thermal fusion bonding. This appropriate material selection and appropriate thermal fusion bonding temperature setting makes it possible to prevent an increase in particle-to-particle resistance in the electrode layer (positive or negative electrode active material layers 13, 15) and to obtain a reduction in contact resistance between the conductive resin layer and the electrode layer (positive or negative electrode active material layers 13, 15) for improvement in battery output performance.

When two active material layers 13, 15 adjoining to the collector 11 (e.g., the positive and negative electrode active material layers 13, 15 of the bipolar electrode 1) use different binder polymers, the lower one of the melting points of the binder polymers is adopted as Ta (° C.). When the collector 11 has a multilayer structure of resin layers, the softening point of the polymer material of the resin layer adjacent and adjoining to the active material layers 13, 15 is adopted as Tb or Tb' (° C.). Further, the higher one of the softening points of the polymer materials of two outermost resin layers is adopted when there are two active material layers 13, 15 adjacent and adjoining to the collector 11 (e.g., positive and negative electrode active material layers 13, 15 in the bipolar electrode 1).

When the collector 11 has a multilayer structure of three or more resin layers, it is preferable that the thermal fusion bonding temperature is higher than the softening point of the polymer material of the inner layer interposed between the outermost layers. If the polymer material of the inner layer fuses in the process of thermal fusion bonding, there arises a possibility that the buffering effect of the inner layer becomes reduced and can fail in improving the peel strength of the collector 11 and the active material layers 13, 15. It is thus desirable to set the thermal fusion bonding temperature higher than the softening point of the polymer material of the inner layer interposed between the outermost layers. When there are two or more inner layers, the lowest one of the softening points of the polymer materials of the inner layers is adopted.

There is no particular limitation on the thermal fusion bonding time as long as the thermal fusion bonding can be performed properly. The thermal fusion bonding time is generally 0.1 second to 10 hours, preferably 5 seconds to 10 minutes.

When the thermal fusion bonding is performed under pressurized conditions, there is no particular limitation on the pressure applied. The applied pressure is preferably 0.01 to 100 MPa, more preferably 2 to 10 MPa.

After the production of the electrode 1, the solvent is removed by drying. The electrode 1 may be impregnated with an electrode material after the production of the electrode 1. In the case of impregnating the active material layers 13, 15 with a gel polymer electrolyte, it is conceivable to remove the slurry solvent simultaneously with a solvent of the gel polymer electrolyte by drying.

A battery according to the present invention is produced using the above-structured electrode 1. There is no particular limitation on the kind of the battery to which the electrode 1 is applied. One example application for the electrode 1 is a nonaqueous electrolyte battery, preferably a lithium-ion secondary battery. The lithium-ion secondary battery achieves high energy density and high output density because of its high unit-cell voltage and thus excels for use as vehicle drive power source or auxiliary power source.

The structure or form of the nonaqueous electrolyte battery is not particularly restricted. The battery can be of any known structure such as laminated (flat) battery structure or winding (cylindrical) battery structure.

The electrical connection (electrode configuration) of the nonaqueous electrolyte secondary battery is not particularly restricted. The battery can be either a non-bipolar type (internally parallel connection type) battery or a bipolar type (internally series connection type) battery. It is however noted that, when the electrode 1 is applied to the bipolar type battery, the effects of the present invention are more pronounced as mentioned above.

The electrolyte material of the nonaqueous electrolyte secondary battery is also not particularly restricted. The battery can be either a liquid electrolyte type battery with a nonaqueous electrolyte solution impregnated into a separator or a so-called polymer type battery such as polymer gel electrolyte type battery or solid polymer electrolyte (all-solid-state electrolyte) type battery. In the polymer type battery, the electrolyte material (polymer gel electrolyte, solid polymer electrolyte) can be used alone or can be used by being impregnated into a separator.

Figure 2:
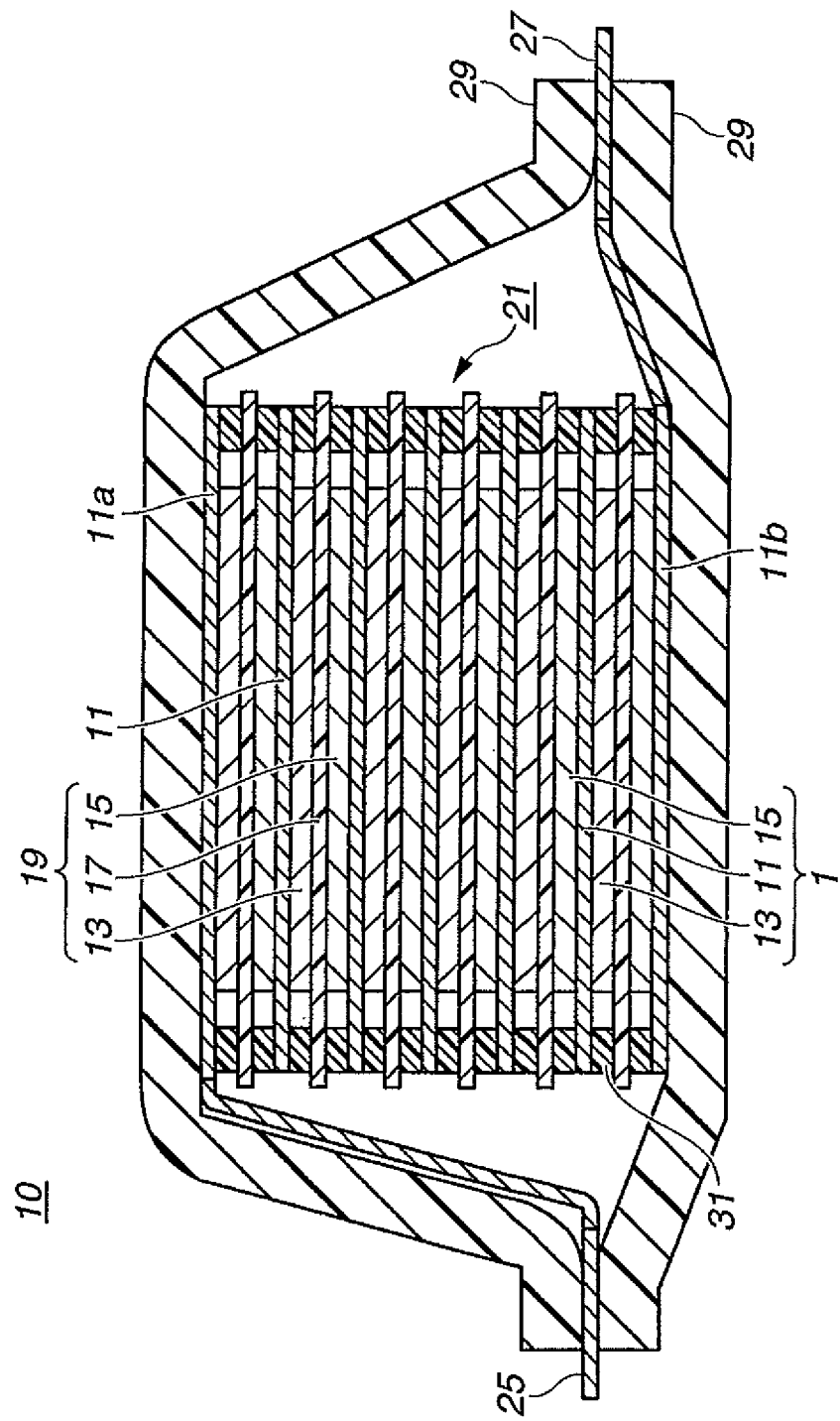
FIG. 2 is a schematic cross-section of a bipolar battery according to one embodiment of the invention.

FIG. 2 shows a bipolar lithium-ion secondary battery 10 according to one exemplary embodiment of the invention. Bipolar lithium-ion secondary battery 10 has battery package 29, e.g. a laminate film, to seal therein a substantially rectangular battery element 21 that actually undergoes a charge/discharge reaction.

In this embodiment, a battery element 21 of bipolar lithium-ion secondary battery 10 is provided with a plurality of bipolar electrodes 1. Each of the bipolar electrodes 1 has a collector 11, a positive electrode active material layer 13 formed on one side of the collector 11 and a negative electrode active material 15 formed on the other side of collector 11 as shown in FIG. 1. In the battery element 21 of bipolar lithium-ion secondary battery 10, bipolar electrodes 1 are laminated via electrolyte layers 17. The adjacent positive electrode active material layer 13, electrolyte layer 17 and negative electrode active material layer 15 function together as one electric cell layer (unit cell) 19. It can be thus said that the bipolar lithium-ion secondary battery 10 has a laminated structure of electric cell layers 19.

In order to prevent the occurrence of liquid short circuits due to electrolyte leakages from electrolyte layers 17, battery element 21 also includes insulating layers (seal members) 31 at outer peripheries of unit cell layers 19. The arrangement of insulating layers (seal members) 31 establishes insulation between respective adjacent collectors 11 and thereby prevents short circuits due to contact of adjacent positive and negative electrode layers 13 and 15.

Battery element 21 includes positive electrode side outermost collector 11a electrically connected to positive electrode tab 25 and negative electrode side outermost collector 11b electrically connected to negative electrode tab 27 so as to take out a current output. In order to decrease the horizontal (planar) electrical resistance of battery element 21, outermost collectors 11a and 11b are preferably a metal foil. Battery element 21 is sealed in battery package 29 with positive and negative electrode tabs 25 and 27 led out of battery package 29. Outermost collectors 11a, 11b and tabs 25, 27 may be electrically connected via positive and negative electrode terminal leads. Alternatively, outermost collector 11a, 11b may also function in place of tabs 25, 27.

Collector plates may be laminated on outer sides of outermost collectors 11a and 11b and connected with tabs 25 and 27 or leads.

With the above configuration, bipolar lithium-ion secondary battery 10 allows a current flow in a vertical direction thereof and thus attains a significantly shortened electron conduction passage to achieve high output performance as compared to a non-bipolar laminated battery. Further, the use of polymer-containing collectors 11 enables weight reduction of battery 10.

The structural components of bipolar lithium-ion secondary battery 10 will be briefly explained below. As the electrode components of bipolar lithium-ion secondary battery 10 are the same as above, explanations of the electrode constituting components are omitted herefrom.

The electrolyte material of electrolyte layers 17 is not particularly limited as long as it functions as a carrier of lithium ions between the positive and negative electrodes during charge/discharge operations. As the electrolyte material, a liquid electrolyte, a polymer electrolyte and an inorganic solid electrolyte (oxide solid electrolyte, sulfide solid electrolyte) can be used.

The liquid electrolyte is in the form of a solution in which a lithium salt (support salt) is dissolved in an organic solvent (plasticizer). Examples of the organic solvent usable as the plasticizer are carbonates such as ethylene carbonate (EC), propylene carbonate (PC), dimethyl carbonate (DMC) and diethyl carbonate (DEC) and diethyl carbonate (DEC). Examples of the lithium salt usable as the support salt are lithium salt compounds such as $Li(CF_3SO_2)_2N$, $Li(C_2F_5SO_2)_2N$, $LiPF_6$, $LiBF_4$, $LiAsF_6$, $LiTaF_6$, $LiClO_4$ and $LiCF_3SO_3$ that can be added to electrode mixture layers.

On the other hand, the polymer electrolyte can be classified into a gel electrolyte containing therein an electrolyte solution and an intrinsic (all-solid-state) polymer electrolyte containing no electrolyte solution.

The gel polymer is in the form of a gel in which the liquid electrolyte is impregnated into a matrix polymer (host polymer). The use of such a gel polymer electrolyte causes a loss of electrolyte flowability so as to advantageously prevent leakage of the electrolyte material to the collector layers, which causes interruption of ion conduction between the respective layers. The matrix polymer (host polymer) is not particularly restricted. Examples of the matrix polymer (host polymer) are polyethylene oxide (PEO), polypropylene oxide (PPO), polyvinylidene fluoride (PVdF), polyvinylidene fluoride-hexafluoropropylene (PVdF-HFP) copolymer, polyethylene glycol (PEG), polyacrylonitrile (PAN), poly(methylmethacrylate) (PMMA) and copolymers thereof.

Examples of the intrinsic polymer electrolyte are polyether polymer electrolytes such as polypropylene oxide (PEO) and polypropylene oxide (PPO). In general, the intrinsic polymer electrolyte is in the form of a matrix polymer dissolving therein the support salt (lithium salt) but not containing the organic solvent (plasticizer). The use of such an intrinsic polymer electrolyte causes a loss of electrolyte flowability and makes it easier to prevent leakage of the electrolyte material to the collector layers that can interrupt ion conduction between the respective layers.

The matrix polymer of the gel polymer electrolyte or intrinsic polymer electrolyte forms a cross-linking structure to provide improved mechanical strength. In order to form such a cross-linking structure, it is conceivable to subject the polymerizable material (such as PEO or PPO) of the polymer electrolyte to any polymerization reaction such as thermal polymerization, ultraviolet polymerization, radiation induced polymerization or electron-beam induced polymerization by the use of any appropriate polymerization initiator.

The electrolyte layers 17 may be formed by impregnating the solid electrolyte or gel electrolyte into separators. Examples of the separators are porous films of polyolefins such as polyethylene and polypropylene.

As outermost collectors (collector plates) 11a and 11b, aluminum foil, stainless steel (SUS) foil, nickel-aluminum clad material, copper-aluminum clad material and plating material of any combination of these metals can be used. Among these, aluminum foil and stainless foil are preferred so that collectors 11a and 11b have the ability to withstand positive and negative electrode potentials to be applied. Polymer-containing collector 11 may also be used as outer collector 11a, 11b.

Positive and negative electrode tabs 25 and 27 are respectively electrically connected to positive and negative electrode side outermost collectors 11a and 11b and led out of battery package 29 so as to take the current output out from battery 10.

The material of tabs 25 and 27 is not particularly restricted. Any known high-conductive material for lithium-ion secondary battery tabs can be used. Preferred examples of the tab material are metal materials such as aluminum, copper, titanium, nickel, stainless steel (SUS) and alloys thereof. In terms of light weight, corrosion resistance and high conductivity, aluminum and copper are more preferred. The tab material of positive electrode tab 25 can be the same as or different from that of negative electrode tab 27. Positive and negative electrode tabs 25 and 27 may be formed by extending portions of outermost collectors 11a and 11b. Alternatively, positive and negative electrode tabs 25 and 27 may be formed separately from and joined to outermost collectors 11a and 11b.

Positive and negative electrode terminal leads are used as needed. For example, when positive and negative electrode tabs 25 and 27 are directly led as output terminals from outermost collectors 11a and 11b, it is unnecessary to use the positive and negative electrode terminal leads.

As the material of the positive and negative electrode terminal leads, there can be used any known material for lithium-ion secondary battery terminal leads. It is desirable to cover any parts led out of battery package 29, generally with heat-resistant, heat-shrinkable insulating tubes, in order to prevent a short circuit from occurring upon contact of these parts with peripheral equipment or wiring that would affect the performance of the product (automotive part, notably electronic equipment).

As battery package 29, various casing materials in addition to a known metal can are acceptable. For example, a bag of aluminum laminate film, e.g. three-layer laminate film in which a PP layer, an aluminum layer and a nylon layer are laminated in this order, can be used. The battery package material is not limited to the above. Among the possible choices, the laminate film is preferred because of its high output and cooling characteristics and applicability to large-equipment batteries such as EV and HEV batteries.

Although the bipolar lithium-ion secondary battery has been described as one preferred embodiment of the invention, a battery of the invention can be configured as a non-bipolar type lithium-ion secondary battery. One example of the non-bipolar lithium-ion secondary battery is that having a laminated structure of positive electrodes in which positive electrode active material layers are formed on opposite sides of positive electrode collectors, electrolyte layers and negative electrodes in which negative electrode active material layers are formed on opposite sides of negative electrode collectors. In this case, the positive electrodes, the electrolyte layers and the negative electrodes are alternately laminated in such a manner that either one of the positive electrodes has its positive electrode active material layer facing the negative electrode active material layer of any one of the negative electrodes adjacent to that positive electrode via the electrolyte layer. As in the case of the bipolar type, positive and negative electrode tabs are electrically joined by, for example, ultrasonic welding or resistance welding to the positive and negative electrode collectors via positive and negative electrode terminal leads. These positive and negative electrode tabs are exposed to the outside of the laminate-film battery package through a thermal fusion bonded part of the outer periphery of the laminate film.

The battery can be produced by any known production method using the above electrode.

Figure 3:
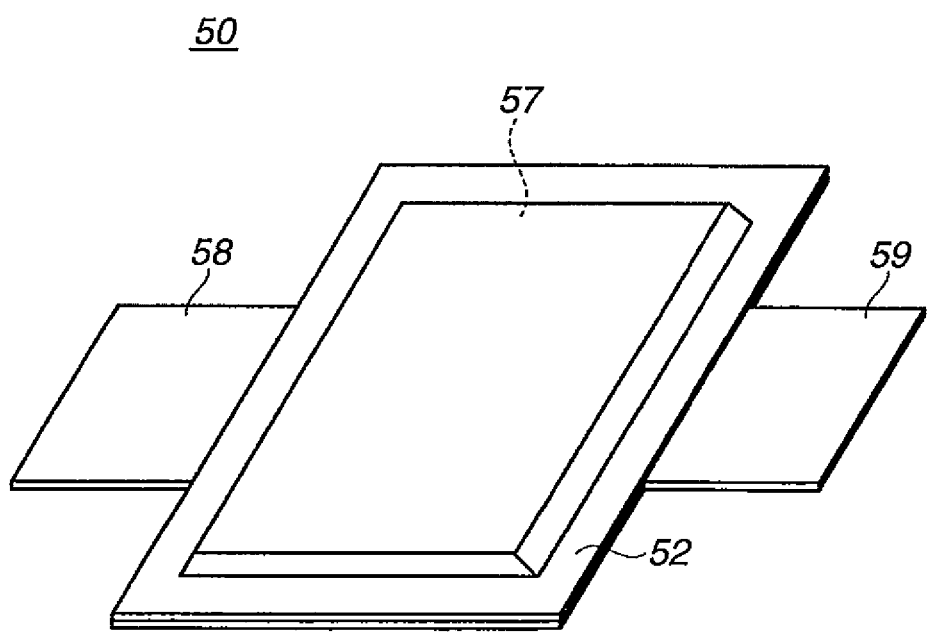
FIG. 3 is a perspective view of the bipolar battery according to one embodiment of the invention.

FIG. 3 is a perspective view showing an appearance of non-bipolar or bipolar nonaqueous electrolyte lithium-ion secondary battery 50 according to another embodiment of the invention.

As shown in FIG. 3, lithium-ion secondary battery 50 has a rectangular flat shape formed with battery element 57 and battery package 52. Battery element 57 is enclosed and sealed in battery package 52 by thermal fusion bonding of the outer periphery of battery package 52, with positive and negative electrode tabs 58 and 59 protruding from opposite sides thereof to extract a battery power output. Herein, battery element 57 corresponds to battery element 21 of bipolar lithium-ion secondary battery 10 of FIG. 2 and thus has a laminated structure of electric cell layers (unit cells) 19, each of which includes positive electrode layer 13, electrolyte layer 17 and negative electrode layer 15.

The battery of the present invention is not limited to the laminated flat structure type shown in FIG. 3 and can alternatively be configured as a winding cylindrical structure type or a rectangular flat structure formed by deforming the cylindrical structure. In the case of the cylindrical battery structure, the package material is not particularly restricted and can be a laminate film or a conventional cylindrical can (metal can).

Further, there is no particular restriction on the lead-out of tabs 58 and 59. The lead-out of tabs 58 and 59 is not limited to that shown in FIG. 3. Positive and negative electrode tabs 58 and 59 can alternatively be led out from the same side or can be divided into plural parts and led out from the respective sides. In the case of the winding battery structure, terminals may be formed using the cylindrical can (metal can) in place of the tabs.

A battery assembly according to the present invention is produced by connecting a plurality of the above batteries, more specifically connecting two or more batteries in series, in parallel or in combination thereof. The capacity and voltage of the battery assembly can be adjusted freely by such series and/or parallel connection of the batteries. It is conceivable in the invention to produce the battery assembly by combining the non-bipolar and bipolar lithium-ion secondary batteries.

Figure 4C:
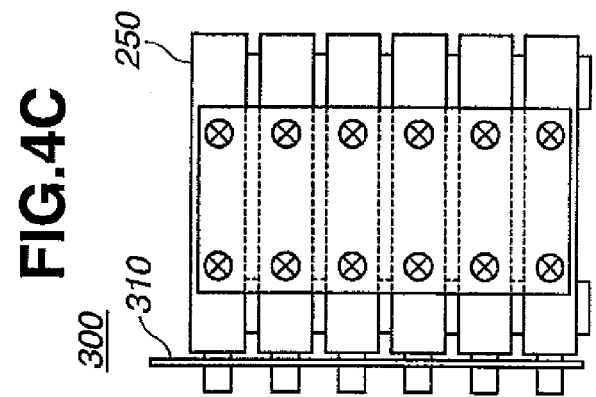
FIGS. 4A, 4B and 4C are a plan view, an elevation view and a side view of a battery assembly respectively according to one embodiment of the invention.
Figure 4A:
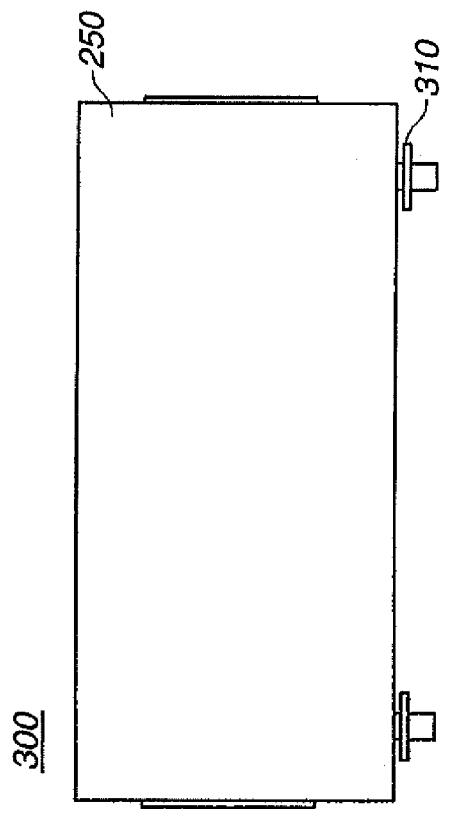
Figure 4B:
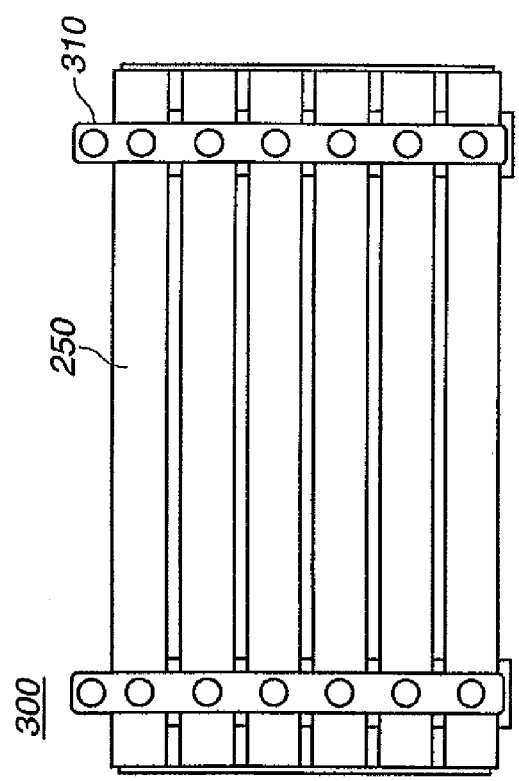

As shown in FIGS. 4A, 4B and 4C, battery assembly 300 according to one embodiment of the invention has a plurality of attachable/detachable battery modules 250 electrically connected in series or in parallel. Each of battery modules 250 has a plurality of bipolar lithium-ion secondary batteries 10 electrically connected in series or in parallel. With this configuration, battery assembly 300 attains high capacity and output characteristics suitable for use as a vehicle-driving power source or auxiliary power source, which requires a high volume energy density and a high volume output density. Battery modules 250 can be electrically connected to each other by electrical connection means such as busbars and can be laminated in layers by connection jig 310. The number of bipolar lithium-ion secondary batteries 10 in battery module 250 and the number of battery modules 250 in battery assembly 300 are determined depending on the battery capacity and output characteristics required of the vehicle on which battery assembly 300 is to be mounted.

A vehicle according to the present invention is characterized by mounting thereon the above battery(s) or battery assembly. The battery of the present invention has high output performance and thus can be mounted on a plug-in hybrid electric vehicle that features a long EV driving distance or an electric vehicle that features a long driving distance on a single charge. In other words, the battery or battery assembly of the present invention can suitably be used as a power source of the vehicle. Examples of the vehicle are automotive vehicles such as hybrid electric vehicles, electric vehicles and fuel-cell vehicles. These automotive vehicles include not only four-wheel vehicles (passenger cars, commercial cars such as trucks and buses, light cars, etc.) but also include two-wheel vehicles (motorbikes, etc.) and three-wheel vehicles. The application of the battery or battery assembly is not limited to the above automotive vehicles. The battery or battery assembly can be applied as a power source for other vehicles and transportation means such as trains and as a mountable/installable power supply such as an uninterruptible power supply.

Figure 5:
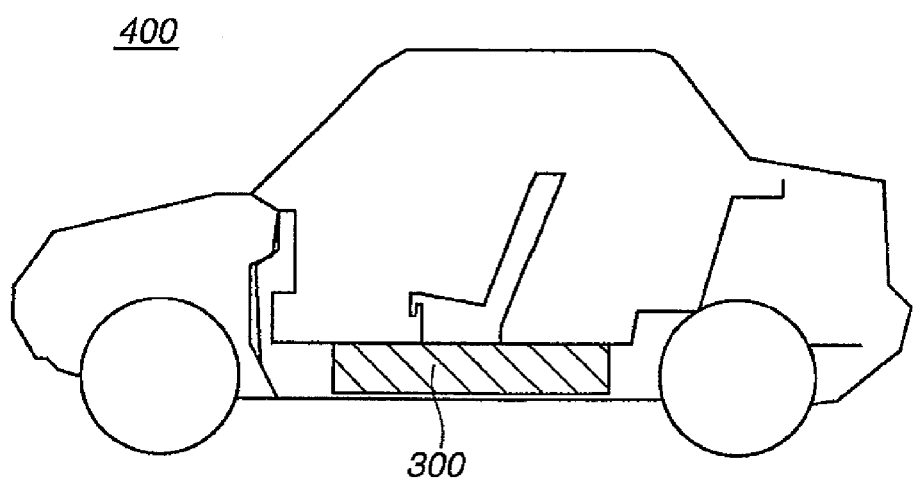
FIG. 5 is a schematic view of an automotive vehicle to which the battery assembly is mounted according to one embodiment of the invention.

In FIG. 5, battery assembly 300 is mounted at a position under a seat in the center of a vehicle body of electric vehicle 400 so as to secure a wide vehicle interior space and trunk rooms. The mounting position of battery assembly 300 is not limited to the position under the seat. Battery assembly 300 may alternatively be mounted in a lower section of the rear trunk room or an engine room of the vehicle front side. Electric vehicle 400 with battery assembly 300 attains high durability and ensures sufficient output.

The present invention will be described below in more detail with reference to the following examples. It should be however noted that the following examples are only illustrative and are not intended to limit the invention thereto.

Example 1

1. Preparation of Positive Electrode Slurry

A positive electrode slurry (viscosity: 2000 cps) was prepared by adding an appropriate amount of N-methyl-2-pyrrolidone (NMP) as slurry viscosity adjusting solvent to a solid content of $LiMn_2O_4$ (average particle size: 5 μm) (85 mass %) as positive electrode active material, acetylene black (5 mass %) as conductive aid and polyvinylidene fluoride (PVdF) (10 mass %) as binder polymer. The softening point and melting point of PVdF are 134° C. and 169° C., respectively.

2. Preparation of Negative Electrode Slurry

A negative electrode slurry (viscosity: 2000 cps) was prepared by adding an appropriate amount of N-methyl-2-pyrrolidone (NMP) as slurry viscosity adjusting solvent to a solid content of hard carbon (average particle size: 5 μm) (85 mass %) as negative electrode active material, acetylene black (5 mass %) as conductive aid and polyvinylidene fluoride (PVdF) (10 mass %) as binder polymer. The softening point and melting point of PVdF are 134° C. and 169° C., respectively.

3. Formation of Bipolar Electrodes

The positive electrode slurry was applied to aluminum foil. On the other hand, the negative electrode slurry was applied to copper foil.

Collectors (thickness: 50 μm) were formed using polyethylene (softening point: 115° C., melting point: 130° C.) (70 mass %) as a polymer material and fine carbon particles (Ketjen black, average particle size: 100 nm) (30 mass %) as a conductive filler. While forming positive and negative electrode layers on each of the collectors by transferring the positive electrode slurry and the negative electrode slurry from the metal foils, the collector and the active material layers were bonded by thermal fusion bonding at 160° C. for 5 minutes. The thermal fusion bonding was performed by pressing with 6 MPa of pressure.

Figure 6:
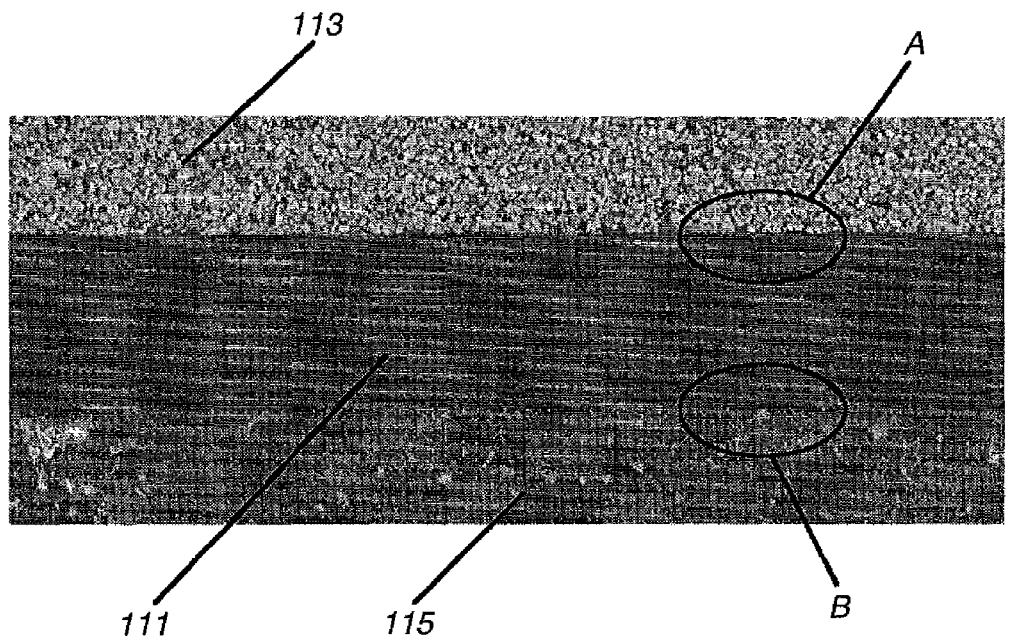
FIG. 6 is an optical microphotograph of a bipolar electrode according to Example 1 of the invention.

The thus-obtained bipolar electrode was observed with an optical microscope as shown in the optical microphotograph of FIG. 6.

In FIG. 6, the reference numeral 113 designates the positive electrode active material layer; the reference numeral 115 designates the negative electrode active material layer; the reference numeral 111 designates the collector interposed between the positive and negative electrode active material layers 113 and 115; the reference character A designates the interface area between the collector 111 and the positive electrode active material layer 113 (hereinafter referred to as "positive electrode side interface area"); and the reference character B designates the interface area between the collector 111 and the negative electrode active material layer 115 (hereinafter referred to as "negative electrode side interface area").

Figure 7A:
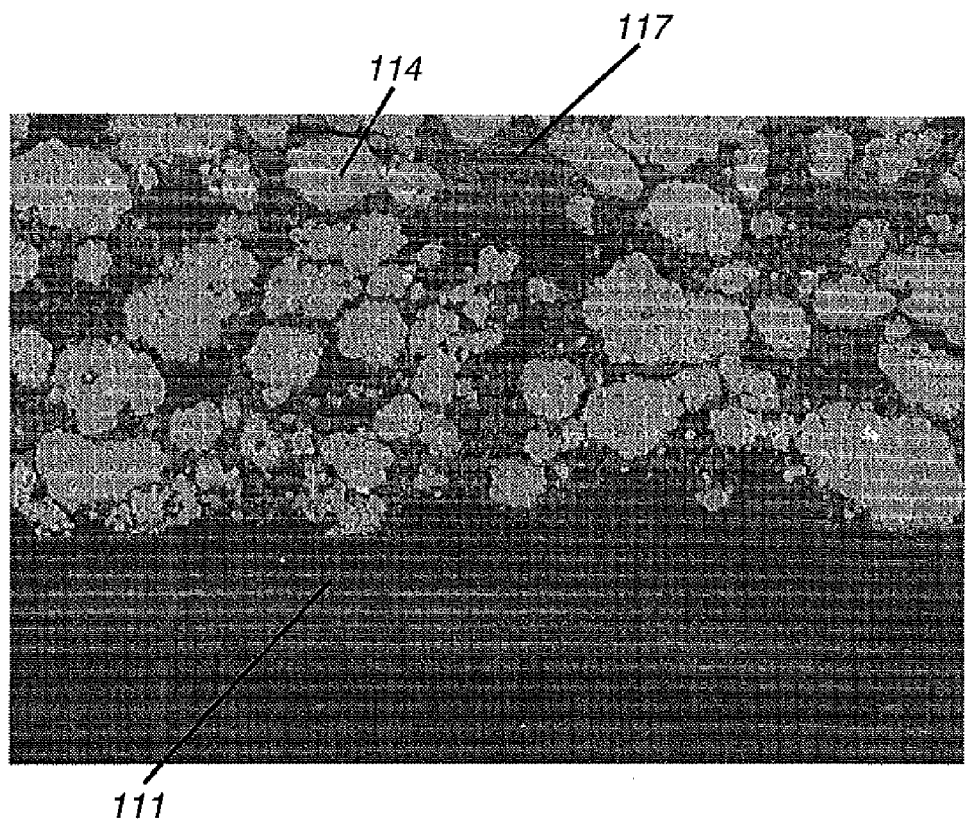
FIGS. 7A and 7B are enlarged views of a positive electrode side of the bipolar electrode of FIG. 6.
Figure 7B:
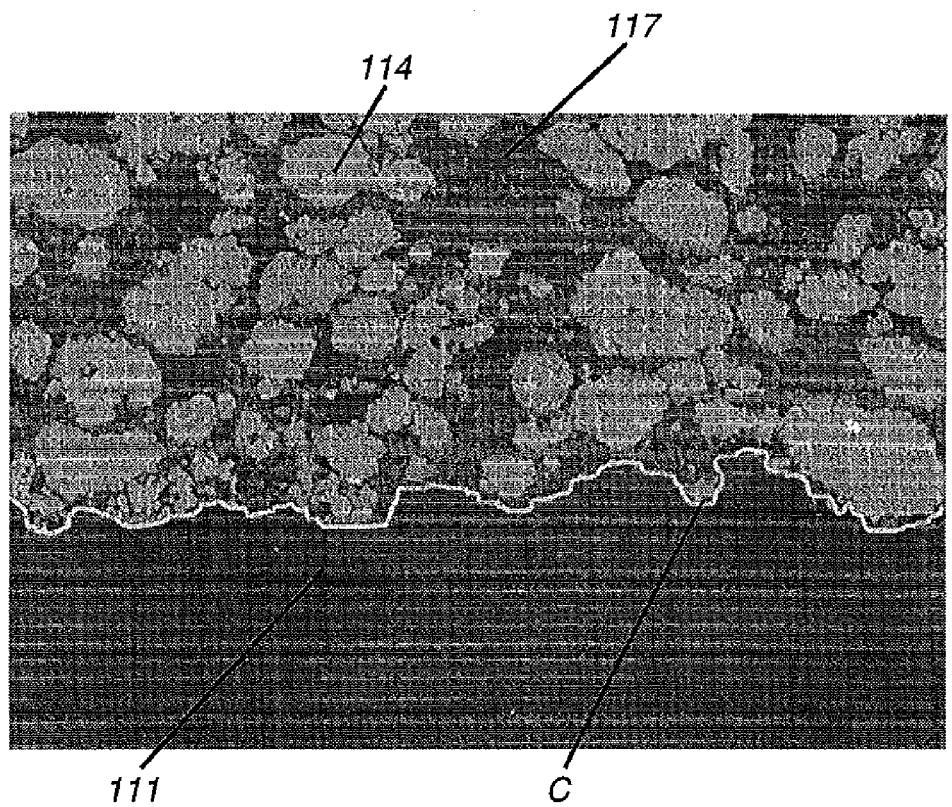

FIGS. 7A and 7B are enlarged views of the positive electrode side interface area A of FIG. 6. In FIGS. 7A and 7B, the reference numeral 114 designates the positive electrode active material; the reference 117 designates the binder polymer; and the reference character C designates the interface between the collector 11 and the positive electrode active material layer 113. As shown FIGS. 7A and 7B, the positive electrode active material layer 113 was formed in such a manner that the positive electrode active material 114 was dispersed in and surrounded by the binder polymer 117. The binder polymer 117 did not melt and thus maintained its structure (shape). On the other hand, the resin layer of the collector 111 was fused and bonded to the positive electrode active material layer 114 in such a manner that the collector resin layer cut into the active material layer 114. (See the interface C in FIG. 7B.)

Figure 8A:
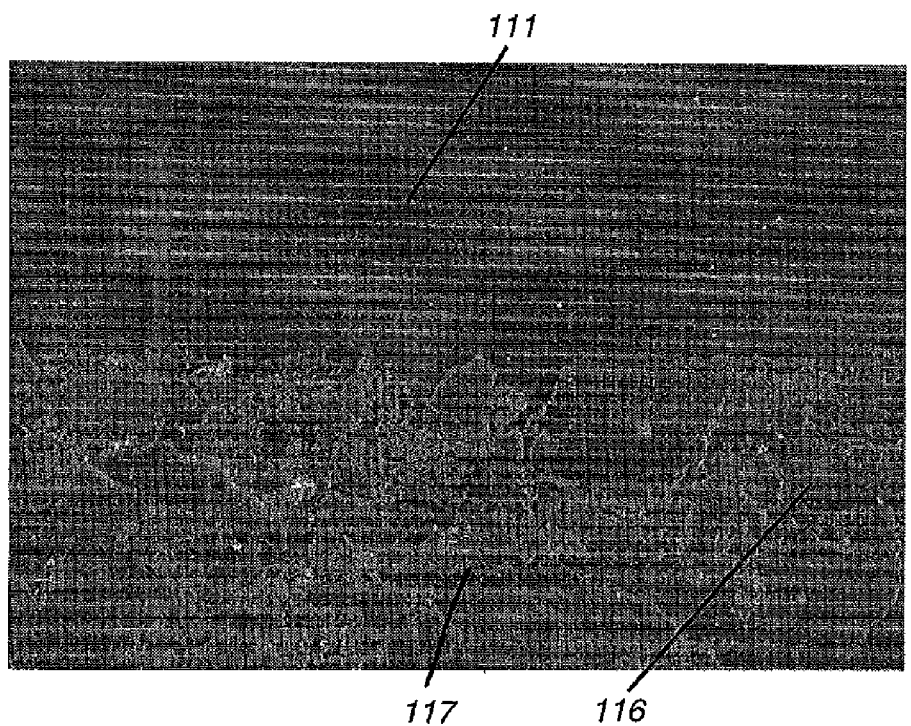
FIGS. 8A and 8B are enlarged views of a negative electrode side of the bipolar electrode of FIG. 6.
Figure 8B:
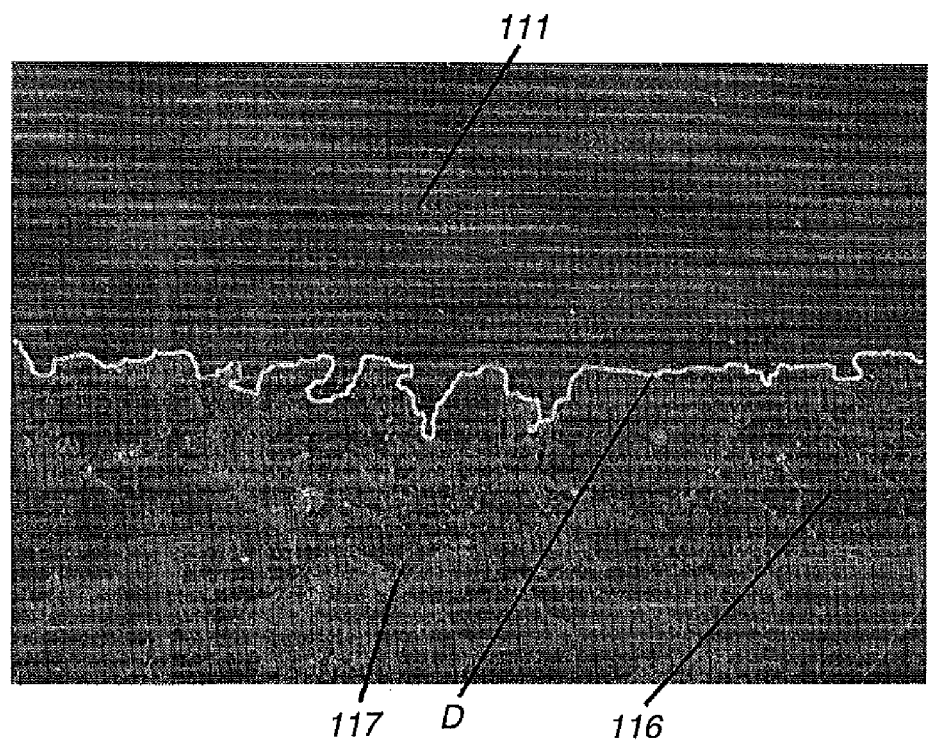

FIGS. 8A and 8B are enlarged views of the negative electrode side interface area B of FIG. 6. In FIGS. 8A and 8B, the reference numeral 116 designates the negative electrode active material; and the reference character D designates the interface between the collector 111 and the negative electrode active material layer 115. Similarly, the negative electrode active material layer 115 was formed in such a manner that the negative electrode active material 116 was dispersed in and surrounded by the binder polymer 117 as shown in FIGS. 8A and 8B. The binder polymer did not melt and thus maintained its structure (shape). On the other hand, the resin layer of the collector 111 was fused and bonded to the negative electrode active material layer 115 in such a manner that the collector resin layer cut into the active material layer 115. (See the interface D in FIG. 8B.)

It was possible to perform the thermal fusion bonding without melting of the binder polymer 117 by setting the softening point of the polymer material of the resin layer of the collector 111 to be lower than the melting point of the binder polymer 117 of the active material layers 113, 115 and by setting the thermal fusion bonding temperature higher than the softening point of the polymer material of the resin layer of the collector 111 and lower than the melting point of the binder polymer 117. By such thermal fusion bonding, the contact resistance between the collector 111 and the active material layers 113, 115 could be reduced while maintaining the structure of the binder polymer 117 to perform the function of the active material 114, 116.

An electrolyte material (pre-gel solution) was prepared by mixing 90 wt % of an electrolyte solution and 10 wt % of a host polymer into a viscosity adjusting solvent. Herein, a mixture of propylene carbonate (PC) and ethylene carbonate (EC) (volume ratio 1:1) containing 1.0 M $LiPF_4$ was used as the electrolyte solution. As the host polymer, polyvinylidene fluoride-hexafluoropropylene (PVdF-HFP) copolymer was used. Further, dimethyl carbonate (DMC) was used as the viscosity adjusting solvent.

The electrolyte material (pre-gel solution) was applied to the entire surfaces of the positive and negative electrode layers of the above-formed bipolar electrodes and dried at 50° C. to remove the DMC. The bipolar electrodes impregnated with the gel electrolyte material were then provided. Each of the completed bipolar electrodes had a positive electrode active material layer thickness of 65 μm and a negative electrode active material layer thickness of 135 μm.

4. Formation of Gel Polymer Electrolyte Layers

Gel polymer electrolyte layers were formed by applying the above-prepared electrolyte material to opposite sides of porous polypropylene film separators (thickness: 20 μm), drying the applied electrolyte material at 50° C. and thereby removing the DMC.

5. Lamination

The gel polymer electrolyte layer was placed on the positive electrolyte layer of the bipolar electrode, followed by setting a seal member of PE film with a width of 12 mm around the gel polymer electrolyte layer. The above operation was repeated to laminate the bipolar electrodes in five layers. The laminate of the bipolar electrodes and the seal members was then subjected to pressing (heat and pressure) from above and below, thereby fusing the seal members to seal the respective layers. The pressing conditions were 0.2 MPa, 160° C. and 5 seconds.

Electrical terminal members were prepared by using Al plates having a thickness of 100 μm and such a size that covers the entire projection plane of the thus-obtained bipolar battery element with portions thereof extending to the outside of the battery projection plane. The bipolar battery element was held between the terminal members. The bipolar battery and the terminal members were vacuum-sealed by aluminum laminate and pressed at an atmospheric pressure from both sides. By this, the bipolar battery with increased contact between the battery element and the electrical terminal members was completed.

Example 2

A bipolar battery was produced in the same manner as in Example 1, except that collectors (thickness: 50 μm) were formed using polypropylene (softening point: 140° C., melting point: 155° C.) (70 mass %) as the polymer material and fine carbon particles (30 mass %) as the conductive filler.

Example 3

A bipolar battery was produced in the same manner as in Example 1, except that collectors (thickness: 50 μm) were formed using polypropylene (softening point: 140° C., melting point: 155° C.) (90 mass %) as the polymer material and fine Au particles (average particle size: 10 nm) (10 mass %) as the conductive filler.

Example 4

A bipolar battery was produced in the same manner as in Example 1, except that collectors (thickness: 50 μm) were formed using polyethylene (softening point: 115° C., melting point: 130° C.) (90 mass %) as the polymer material and fine Au particles (average particle size: 10 nm) (10 mass %) as the conductive filler.

Example 5

1. Preparation of Positive and Negative Electrode Slurries

Positive and negative electrode slurries were prepared in the same manner as in Example 1, except that thermosetting epoxy resin was used as the binder polymer.

2. Production of Bipolar Electrodes

Bipolar electrodes were produced in the same manner as in Example 1, except that collectors (thickness: 50 μm) were formed using polyimide (softening point: 350° C., melting point: 400° C.) (70 mass %) as the polymer material and fine carbon particles (Ketjen black, average particle size: 100 nm) (30 mass %) as the conductive filler. In addition, the thermal fusion bonding was performed at 410° C.

3. Formation of Gel Polymer Electrolyte Layers and Lamination

A bipolar battery was produced in the same manner as in Example 1 using the above-produced bipolar electrodes.

Example 6

A bipolar battery was produced in the same manner as in Example 5, except that fine Au particles (average particle size: 10 nm) were used as the conductive filler.

Example 7

A bipolar battery was produced in the same manner as in Example 1, except that each of collectors (thickness: 50 μm) was formed with a three-layer structure by laminate process of two outermost layers (each thickness: 50 μm) using polyethylene (softening point: 115° C., melting point: 130° C.) (70 mass %) as the polymer material and fine carbon particles (Ketjen black, average particle size: 100 nm) (30 mass %) as the conductive filler and an inner layer (thickness: 50 μm) using polyimide (softening point: 350° C., melting point: 400° C.) (70 mass %) as the polymer material and fine carbon particles (Ketjen black, average particle size: 100 nm) (30 mass %) as the conductive filler.

Example 8

1. Preparation of Positive Electrode Slurry

A high-viscosity positive electrode slurry (viscosity: 100000 cps) was prepared by adding an appropriate amount of N-methyl-2-pyrrolidone (NMP) as a slurry viscosity adjusting solvent to a solid content of $LiMn_2O_4$ (average particle size: 5 μm) (85 mass %) as the positive electrode active material, acetylene black (5 mass %) as a conductive aid and polyvinylidene fluoride (PVdF) (10 mass %) as a binder polymer. The softening point and melting point of PVdF are 134° C. and 169° C., respectively.

2. Preparation of Negative Electrode Slurry

A high-viscosity negative electrode slurry (viscosity: 100000 cps) was prepared by adding an appropriate amount of N-methyl-2-pyrrolidone (NMP) as a slurry viscosity adjusting solvent to a solid content of hard carbon (average particle size: 5 μm) (85 mass %) as the negative electrode active material, acetylene black (5 mass %) as a conductive aid and polyvinylidene fluoride (PVdF) (10 mass %) as a binder polymer. The softening point and melting point of PVdF are 134° C. and 169° C., respectively.

3. Formation of Bipolar Electrodes

Collectors (thickness: 50 μm) were formed using polyethylene (softening point: 115° C., melting point: 130° C.) (70 mass %) as a polymer material and fine carbon particles (Ketjen black, average particle size: 100 nm) (30 mass %) as a conductive filler. The high-viscosity positive and negative electrode slurries were applied to the collectors using a dispenser or bar coater. The thermal fusion bonding of the collectors and the active material layers was performed at 160° C. for 10 minutes by pressing with 6 MPa of pressure.

A bipolar battery was produced in the same manner as in Example 1, except for the above processes.

Example 9

A bipolar battery was produced in the same manner as in Example 1, except that collectors (thickness: 50 μm) were formed using polypropylene (softening point: 140° C., melting point: 155° C.) (70 mass %) as the polymer material and fine carbon particles (30 mass %) as the conductive filler. In addition, the thermal fusion bonding was performed at 150° C.

Example 10

A bipolar battery was produced in the same manner as in Example 1, except that collectors (thickness: 50 μm) were formed using polypropylene (softening point: 140° C., melting point: 155° C.) (70 mass %) as the polymer material and fine carbon particles (30 mass %) as the conductive filler. In addition, the thermal fusion bonding was performed at 140° C.

Comparative Example 1

A bipolar battery was produced in the same manner as in Example 1, except that bipolar electrodes were formed by using collectors (thickness: 30 μm) of SUS metal foil and applying the electrode slurries to the collectors with a coater.

Comparative Example 2

A bipolar battery was produced in the same manner as in Example 1, except that bipolar electrodes were prepared by forming collectors (thickness: 50 μm) using polypropylene (softening point: 140° C., melting point: 155° C.) (70 mass %) as the polymer material and fine carbon particles (30 mass %) as the conductive filler, applying the electrode slurries to the collectors with a coater and then pressing the applied electrode slurries at 6 MPa.

Evaluation 1: Collector Volume Resistivity

The volume resistivity of the collector in the thickness direction thereof was measured. The measurement results are indicated in TABLE 1.

TABLE 1

| Example | Volume resistivity in thickness direction ($\Omega \cdot cm$) |
|---|---|
| 1 | $1 \times 10^{-1}$ |
| 2 | $1 \times 10^{-1}$ |
| 3 | $1 \times 10^{-2}$ |
| 4 | $1 \times 10^{-2}$ |
| 5 | $1 \times 10^{-1}$ |
| 6 | $1 \times 10^{-2}$ |
| 7 | $1 \times 10^{-1}$ |
| 8 | $1 \times 10^{-1}$ |
| 9 | $1 \times 10^{-1}$ |
| 10 | $1 \times 10^{-1}$ |

Evaluation 2: Battery Internal Resistance

Each of the batteries was subjected to charge/discharge test. In the test, the battery was charged to 4.2 V with a constant current (CC) of 50 mA and then further charged with a constant voltage (CV). The total charge time was 10 hours. After that, the battery was discharged with 10 mA for 5 seconds. The internal resistance of the battery was determined based on the battery voltage during the discharge. The battery resistance measurement results are indicated in TABLES 2-1 and 2-2 as relative values assuming the battery internal resistance of Comparative Example 1 as 100%. The weight of the battery was measured. The battery weight measurement results are also indicated in TABLES 2-1 and 2-2 as relative values assuming the battery weight of Comparative Example 1 as 100%. Further, the ratio of the resistance of the collector in the thickness direction thereof to the ratio of the bipolar battery was calculated. The calculation results are indicated in TABLES 2-1 and 2-2.

TABLE 2-1

| | Example | | | | | |
|---|---|---|---|---|---|---|
| | 1 | 2 | 3 | 4 | 5 | 6 |
| Battery weight | 70% | 70% | 76% | 76% | 70% | 76% |
| Internal resistance | 102% | 102% | 100% | 100% | 102% | 100% |
| Collector resistance relative to battery resistance | 1/1000 | 1/1000 | 1/10000 | 1/10000 | 1/1000 | 1/10000 |

TABLE 2-2

| | Example | | | | Comparative Example | |
|---|---|---|---|---|---|---|
| | 7 | 8 | 9 | 10 | 1 | 2 |
| Battery weight | 79% | 80% | 70% | 70% | 100% | — |
| Internal resistance | 110% | 105% | 102% | 102% | 100% | 116% |
| Collector resistance relative to battery resistance | 1/1000 | 1/1000 | 1/1000 | 1/1000 | — | — |

Evaluation 3: Electrode Peel Strength

Each of the bipolar electrodes was subjected to peel strength test. The peel strength test was conducted at a peel angle of 90° and at a peel speed of 1 cm/min. The test results are indicated in TABLES 3-1 and 3-2 as relative values assuming that the peel strength of the electrode of Comparative Example 1 as 100%.

TABLE 3-1

| | Example | | | | | |
|---|---|---|---|---|---|---|
| | 1 | 2 | 3 | 4 | 5 | 6 |
| Peel strength | 110% | 110% | 110% | 110% | 110% | 110% |

TABLE 3-2

| | Example | | | | Comparative example | |
|---|---|---|---|---|---|---|
| | 7 | 8 | 9 | 10 | 1 | 2 |
| Peel strength | 115% | 118% | 110% | 110% | — | 100% |

The following can be concluded from the above test results.

The collector was reduced in weight by the use of the polymer material. (See TABLES 2-1 and 2-2.) The application of such a weight-reduced collector would lead to an improvement in battery output density as compared to the application of the metal foil collector. The weight reduction of the collector was most pronounced when the carbon fine particles were used as the conductive filler.

Upon comparison of the test results of Examples and Comparative Examples in TABLES 2-1 and 2-2, there was not a significant difference in internal resistance between the battery using the conductive polymer film and the conventional type of battery. Further, the resistance of the collector in the thickness direction was negligibly small relative to the battery resistance.

The peel strength of the electrode was made higher by the thermal fusion bonding of the resin collector and the electrode slurry (Examples 1 to 10) than by the pressing of the resin collector and the electrode slurry (Comparative Example 2) as shown in TABLES 3-1 and 3-2. The increase of the electrode peel strength would lead to an improvement in battery conduction path.

The above-described embodiments have been described in order to allow understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law

What is claimed is:

1. A production method of an electrode, comprising:
preparing a collector consisting of a laminated material of three or more conductive resin layers each containing a polymer material, the collector including outermost resin layers and at least one inner layer interposed between the outermost resin layers;
forming an electrode laminate by laminating an active material layer on the collector, the active material layer containing a binder polymer having a melting point, wherein the polymer material of each of the three or more conductive resin layers has a softening point lower than the melting point of the binder polymer; and wherein the polymer material of one of the outermost resin layers disposed nearer to the active material layer than the other of the outermost resin layers has a softening point lower than that of the polymer material of the at least one inner layer; and thermal fusion bonding the conductive resin layer to the active material layer in the electrode laminate at a thermal fusion bonding temperature selected to fuse the polymer material without melting the binder polymer.

2. The production method of the electrode according to claim 1, wherein the binder polymer is a thermoplastic polymer; and wherein the thermal fusion bonding is performed at a thermal fusion bonding temperature T satisfying: Tb−10<T<Ta where Tb is a softening point of a polymer material of the conductive resin layer and Ta is a melting point of the binder polymer.

3. The production method of the electrode according to claim 2, wherein the active material layer is formed on the resin layer by transferring or by applying a high viscosity precursor of the active material layer onto the resin layer, the high viscosity precursor having a viscosity in the range of 100 to 100,000 cps at 30 to 40° C.

4. The production method of the electrode according to claim 1, wherein the binder polymer is a thermosetting polymer; and wherein the thermal fusion bonding is performed at a thermal fusion bonding temperature T' satisfying: Tb'−10<T' where Tb' is a softening point of a polymer material of the conductive resin layer.

5. The production method of the electrode according to claim 1, wherein thermally bonding the collector to the active material layer is performed at the thermal fusion bonding temperature that is higher than a softening point of the at least one inner resin layer.

6. A production method of an electrode, comprising:

preparing a collector consisting of a laminated material of three or more conductive resin layers each containing a polymer material, the collector including outermost resin layers and at least one inner layer interposed between the outermost resin layers;

forming an electrode laminate by laminating an active material layer on the collector, the active material layer containing a binder polymer having a melting point, wherein the polymer material of each of the three or more conductive resin has a softening point lower than a melting point of the binder polymer; and wherein the polymer material of one of the outermost resin layers adjacent to the active material layer has a softening point lower than that of the polymer material of the at least one inner resin layer; and thermal fusion bonding the conductive resin layer to the active material layer in the electrode laminate at a thermal fusion bonding temperature selected to fuse the polymer material without melting the binder polymer.

* * * * *